April 4, 1950     C. BERKLEY     2,502,503
PHOTOSENSITIVE DEVICE USING A SEMITRANSPARENT
MIRROR AND AN OSCILLOSCOPE FOR TESTING
RAZOR BLADES FOR SHARPNESS
Filed May 8, 1947
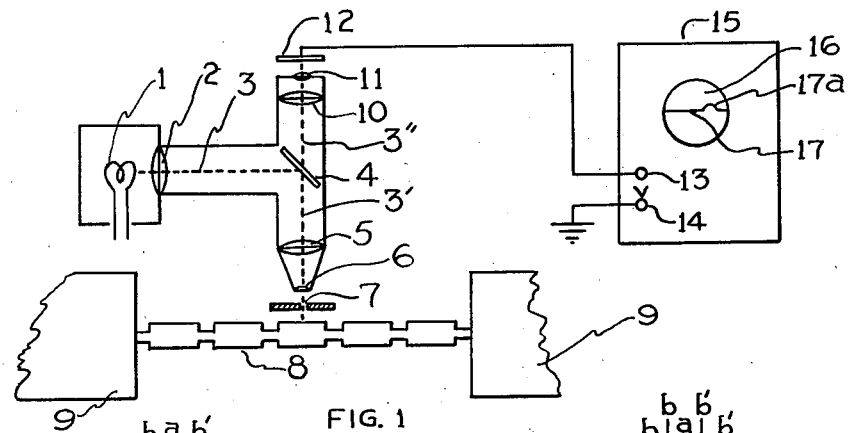
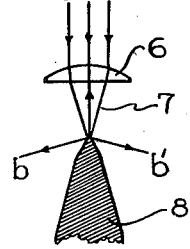
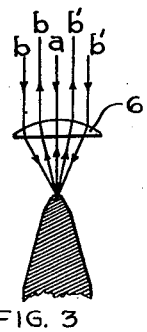
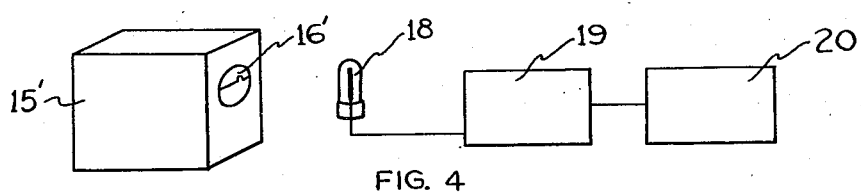
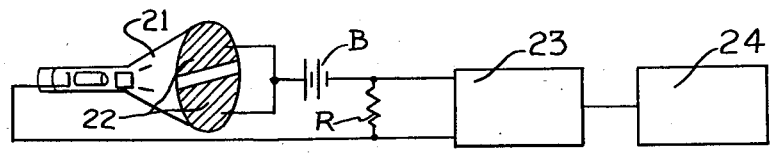
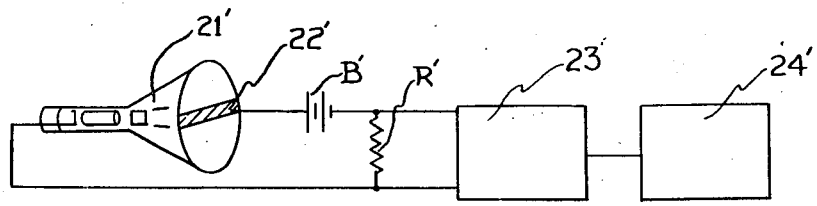
INVENTOR
Carl Berkley
by
Charles W. Mortimer
ATTY Patented Apr. 4, 1950

2,502,503

UNITED STATES PATENT OFFICE 2,502,503

PHOTOSENSITIVE DEVICE USING A SEMI-TRANSPARENT MIRROR AND AN OSCILLOSCOPE FOR TESTING RAZOR BLADES FOR SHARPNESS

Carl Berkley, New York, N. Y., assignor to Allen B. Du Mont Laboratories, Inc., Passaic, N. J., a corporation of Delaware Application May 8, 1947, Serial No. 746,753

1 Claim. (Cl. 88—14)

This invention relates to a device for indicating on the screen of a cathode-ray tube the sharpness of edges of blades or other objects and segregating said blades or other objects.

In carrying out the invention light is projected by means of an optical system onto the edge to be tested and the reflected light is applied to a photosensitive device and the resulting signal is applied to the deflection plates of a cathode-ray tube. The beam of the cathode-ray tube is deflected along one coordinate to represent the reflected light and along another coordinate to indicate the position of the blade. This last motion of the beam is synchronized with the movement of the blades with respect to the optical system. Dull spots show up on the screen of the cathode-ray tube as irregularities on an otherwise straight line, the magnitude and extent of the irregularity being proportional to the magnitude and extent of the area of dullness on the blade.

The invention may be understood from the accompanying drawing in which:

Fig. 1 is a schematic diagram of the apparatus.

Fig. 2 is an enlarged view of the edge of a sharp blade, the incident and reflected light and one of the lenses of the optical system.

Fig. 3 is a similar view showing the edge of a dull blade.

Fig. 4 shows a somewhat diagrammatic embodiment of a modification of the device.

Figs. 5 and 6 show other diagrammatic embodiments of other modifications of the device.

In the drawings reference character 1 indicates a source of light from which a beam 3 of light passes through a concentrating lens 2 to a semi-transparent mirror 4 where a portion 3' of it is reflected at right angles to its original path and passes through lenses 5 and 6 and orifice 7 and strikes the edge of the connected blades 8 which are carried by a device 9 in such a way as to be caused to pass the slit 7 at a contant speed. A portion 3'' of the light beam 3' is reflected back along its original path and passes through the mirror 4, and the lenses 10 and 11 and impinges upon the photocell 12 where it generates an electrical signal that is applied across the terminals 13 and 14 of an oscilloscope 15. The blades are moved at a rate that is synchronous with the horizontal sweep of the oscilloscope and the signals derived from the photocell 12 are applied to the vertical deflection circuits of the oscilloscope. In this way these signals are caused to deflect the beam and produce a vertical displacement thereof.

The way in which this reflection takes place is shown in greater detail in Figs. 2 and 3. A ray $a$ striking directly on the edge of a sharp blade 8, Fig. 2, will be reflected directly back on itself. A ray $b$ or $b'$ striking the slope along one side will be reflected too far out to be collected by the lens 6. In the case of a dull edge, Fig. 3, a ray $a$ striking directly on the edge will be reflected directly back. Also, a ray $b$ or $b'$ striking somewhat to one side of the edge will be reflected along a path sufficiently close to the original path to be collected by the lens 6 and impinge on the photocell thereby generating a greater signal than that of light reflected by a sharp blade.

The normal reflection of a sharp blade causes the cathode-ray beam to travel along the line 17 until it comes to a dull portion when the greater reflection causes the greater deflection of the beam as indicated by the bulge 17a on the line 17.

A device of the known sort may be modified to actuate a device that would mark or reject any blades found to be dull in excess of a certain limit. This could be done by applying an opaque paint to a strip covering the line that the cathode-ray would follow with a normal blade. A photocell arranged to pick up the light emitted from the fluorescent screen would receive no light unless the beam were deflected by a dull spot on the blade beyond this narrow band. The resulting electrical impulse could be used to activate a relay that would mark the defective blade so that it could later be cut out of the strip or reject it in a single operation.

This arrangement is shown in Fig. 4 which shows the oscilloscope 15' with its screen 16' masked in the center with opaque paint. Directly in front of the screen 16' is a photocell 18 followed by an amplifier 19 which actuates a device 20, which may be a solenoid or other means to mark or reject the defective blade.

Another arrangement of this sort is shown in Fig. 5, in which reference character 21 indicates a cathode-ray tube of an oscilloscope supplied with signals from the photocell 12 of Fig. 1. On the inside of the screen of this tube is placed a conductive coating 22 except for a narrow strip in the center which the beam traverses when a sharp blade is being tested. Any variation in the path of the beam, such as would be caused by a dull blade, causes the beam to strike the conductive coating 22, and a current flows from battery B through resistance R, causing a voltage to be applied to amplifier 23 which actuates a device 24 which may be a solenoid or other means to mark or reject the defective blade.

Still another arrangement of this sort is shown in Fig. 6, in which the reference characters, indicated by primes, are the same as in Fig. 5. In this case, the conductive coating 22' is placed along a narrow strip on the screen which the beam normally traverses when a sharp blade is being tested, and absence of a signal to the amplifier 23' causes the device 24' to mark or reject the defective blade.

In testing double edge blades two units of this sort may be used, one for each edge.

What is claimed is:

Apparatus for testing the sharpness of an edge comprising a source of light, a semi-transparent mirror positioned in the path of said light to direct said light onto said edge through a limiting aperture, a single photosensitive device positioned behind said mirror to receive solely light reflected directly by said edge through said mirror and a cathode ray oscilloscope connected to said photosensitive device to indicate the electrical output therefrom, said mirror, said aperture, said edge and said photosensitive device being located in alignment, whereby the light reflected by said edge onto said photosensitive device is an indication of the sharpness thereof.

CARL BERKLEY.

REFERENCES CITED

The following references are of record in the file of this patent:

UNITED STATES PATENTS

| Number | Name | Date |
| --- | --- | --- |
| 2,027,595 | Knobel | Jan. 14, 1936 |
| 2,098,326 | Wente | Nov. 9, 1937 |
| 2,244,826 | Cox | June 10, 1941 |
| 2,256,102 | Reason | Sept. 16, 1941 |
| 2,349,687 | Williams | May 23, 1944 |